United States Patent [19]

Wright

[11] Patent Number: 4,559,714
[45] Date of Patent: Dec. 24, 1985

[54] PITCH MEASURING APPARATUS

[76] Inventor: Randall J. Wright, 3535 Studio Ct., Brookfield, Wis. 53005

[21] Appl. No.: 466,718

[22] Filed: Feb. 15, 1983

Related U.S. Application Data

[63] Continuation of Ser. No. 222,611, Jan. 5, 1981, abandoned.

[51] Int. Cl.$^4$ ............................................. G01C 9/24
[52] U.S. Cl. ........................................ 33/379; 33/389
[58] Field of Search ...................... 33/174 C, 379, 389

[56] References Cited

U.S. PATENT DOCUMENTS

| | | | |
|---|---|---|---|
| 807,873 | 12/1905 | Sharp | 33/389 |
| 1,134,162 | 4/1915 | Schmid | 33/379 |
| 2,576,202 | 11/1951 | Wullschleger | 33/379 |
| 2,939,947 | 6/1960 | Schultz | 33/379 |
| 2,948,067 | 8/1960 | Mistretta | 33/389 |
| 3,593,428 | 7/1971 | Jacoff | 33/379 |
| 3,871,109 | 3/1975 | Vaida | 33/379 |
| 4,073,062 | 2/1978 | Wright | 33/388 |
| 4,335,524 | 6/1982 | Schimming | 33/379 |
| 4,347,088 | 8/1982 | Jacquet | 33/389 |

FOREIGN PATENT DOCUMENTS

| | | | |
|---|---|---|---|
| 358733 | 9/1922 | Fed. Rep. of Germany | 33/389 |
| 1066909 | 6/1954 | France | 33/389 |
| 620805 | 3/1961 | Italy | 33/379 |
| 891227 | 3/1962 | United Kingdom | 33/379 |

OTHER PUBLICATIONS

Hauser, "Are Spirit Levels Good Enough?", *Metalworking Production*, Oct. 26, 1960, pp. 87–89.

Primary Examiner—Richard R. Stearns
Attorney, Agent, or Firm—McDougall, Hersh & Scott

[57] ABSTRACT

A pitch measuring device for measuring the deviation of one line or plane from a referenced line or plane. The device comprises a pitch vial including a cavity containing a liquid and a bubble hermetically sealed therein. Indicia, pre-calibrated to the axis of the vial body, are applied to the vial body to provide a visual display of the amount of pitch of a measured surface by reference to bubble position in the vial cavity in relation to the body indicia. The vial cavity is symmetrically disposed about the vial axis with a larger radius at one end than at the other of the vial to provide pre-selected bubble orientation in response to selected pitch conditions.

6 Claims, 4 Drawing Figures

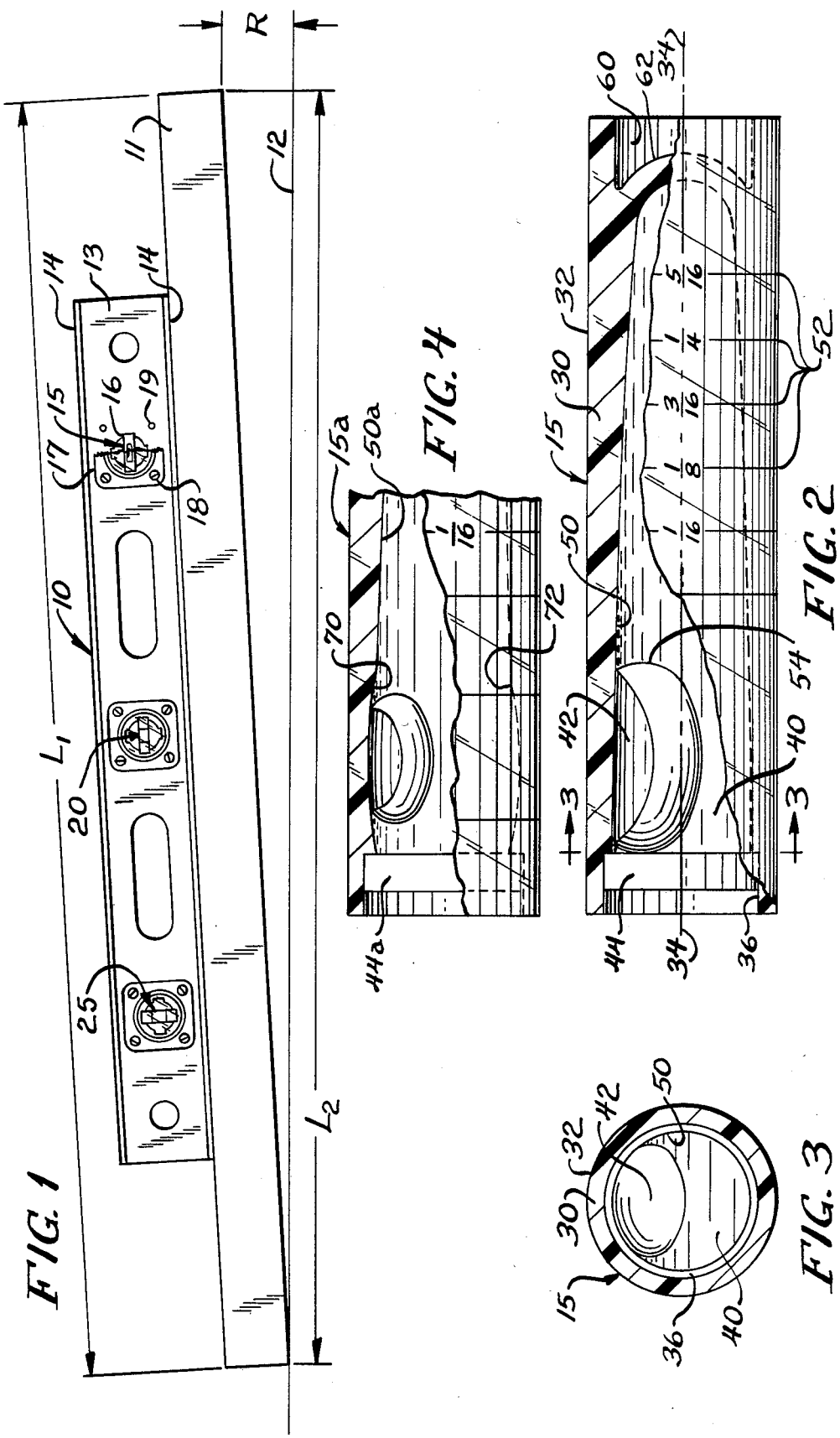

PITCH MEASURING APPARATUS

This is a continuation, of application Ser. No. 222,611, filed Jan. 5, 1981, and now abandoned.

BACKGROUND OF THE INVENTION

This invention relates to a pitch measuring device which may be used to indicate, with precision, the amount of deviation of a first line or plane from a second or reference line in terms of a linear measure of rise or pitch per given unit of length. This is achieved through the combination of a frame with an assembled pitch vial wherein the inner diameter of a liquid and bubble containing vial cavity is larger at a first end than the second and, at a selected point on the vial axis gradually decreases radially as the distance from the first end increases.

Heretofor conventional level devices have been generally provided with one or more level and plumb indicating vials to indicate simply whether or not a given surface was horizontal or plumb without indicating the measured amount of deviation of the measured line from the horizontal or vertical reference line. Utilization of conventional level instruments by skilled artisans is fully satisfactory for level and plumb measurements but is unsatisfactory for applications calling for pitch calculation.

In an effort to improve the shortcomings of conventional prior art level instruments, various designs evolved which utilized spirit vials mounted on the level instruments as an element of a movable protractor type assembly. The vial and protractor assembly could be adjusted until the bubble in the vial indicated a given or selected level condition. The vial of such assemblies was typically provided with an indicator which was alignable with indicia on the protractor to indicate angular relationships of the measured surface after adjustment of the vial and protractor assembly. Devices of the type just described are more fully described in specification of the Wright, U.S. Pat. No. 4,073,062. While these patented devices were a needed step forward in the art, the need for careful adjustment made them slower than desirable in use, their complexity inhibited widespread use, and the relatively high manufacturing cost of such devices and consequent increased purchase price thereof reduced the size of their market.

SUMMARY OF THE INVENTION

In general, the device of the present invention makes available to its user, a precise measuring tool which is relatively inexpensive to purchase and is simple and quick to use in determining pitch angles commonly used in the building trades although virtually any degree of rise or slope for a given surface can be determined through selective calibration of the device. In operation, the device of the present invention may be used to provide quick and accurate measurements of the pitch of structural members from a reference plane or line and is ideally suited for use as a layout tool for other than plumb or level surfaces.

The pitch vials made in accordance with the present invention can be manufactured economically, utilizing readily available commercial plastic materials and conventional plastic molding and extruding techniques. Nevertheless, the design of the vial elements of the present invention enable precision to be achieved in parts fabrication, and also simplifies assembly of the elements with a resultant reduced cost of the finished product.

In the prior art of which the applicant is presently aware, spirit vials capable only of identifying alignment or non-alignment of a measured line or plane with a single pre-selected reference line are conventional and widely used.

While prior art patents typified by U.S. Pat. No. 1,488,419 to I. P. Ward, utilized a glass spirit vial defining a generally symmetrical spheroid cavity for a spirit liquid and a bubble, the vial indicated a single, predetermined orientation of bubble in the vial cavity spanning the axial mid-point of the vial. Two indicia on the vial body indicated alignment or non-alignment of the working surface of the level with a horizontal or vertical reference plane in relation to bubble orientation. The vial, however, did not indicate the amount of deviation per given length of measured line.

U.S. Pat. No. 3,311,990 to D. E. Wright shows a vial body with curved cavity surfaces wherein the widest diameter of the cavity is generally intermediate the ends of the vial body. A level instrument employing this vial construction indicated a pre-selected bubble orientation in relation to a working surface but did not indicate varying pitch orientations. Such level instruments are practically limited to identification of level and plumb conditions of a line or plane with respect to a horizontal or vertical reference plane.

The protractor levels, typified by the disclosure of the Wright U.S. Pat. No. 4,073,062, and discussed above, utilize spirit vials of the type illustrated and described in U.S. Pat. No. 3,311,990. These devices, while illustrative of an important advance in the art, nonetheless, have the deficiencies noted above.

The pitch measuring device of the present invention is used to measure the amount of pitch of a measured line or plane relative to a horizontal or vertical reference line or plane and to visually indicate the deviation as a linear measurement. This is accomplished through the use of a conventional level frame having, at least, one working surface, and, at least, one spirit vial of the invention secured to the frame in a manner such that various slopes or deviations will cause the bubble inside of the vial to proportionately and incrementally move and align with indicia on the vial which are pre-calibrated, with respect to the vial, to provide a measurement of rise or deviation per given length of the measured line. The vial is constructed in a manner such that an inner cavity in which the bubble and fluid are contained, has a cross-sectional diameter which is greater at one end than the other and gradually decreases at a selected point on the vial axis towards the other end. The inner surface of the cavity may generally be traced by rotation of a radius at any given point on the longitudinal vial axis. In one embodiment, the radius progressively decreases in dimension along the axis from one vial end to the other. In a second embodiment, the vial end of larger diameter is formed with an adjacent symmetrical crowned or arcuate portion and the radius decrease occurs at the axial end of the crown furthest from the larger vial end and decreases progressively radially towards the other vial end.

DESCRIPTION OF THE DRAWINGS

For a more complete understanding of the invention, reference is made to the drawings in which:

FIG. 1 is a side elevation of a pitch measuring instrument of the present invention;

FIG. 2 is a side elevation with parts broken away of the spirit vial of the present invention;

FIG. 3 is a cross-sectional view of the spirit vial of FIG. 2 taken along lines 3—3 thereof; and FIG. 4 is a partial cross-sectional view of a second vial embodiment of a spirit vial of the invention.

DESCRIPTION OF THE PREFERRED EMBODIMENTS

Referring now to the drawings, FIG. 1 shows a level instrument, generally designated by the reference numeral 10 including the pitch measuring feature of the invention being used to measure the amount of rise "R", of a measured member 11 disposed above a reference line 12. The instrument 10 generally includes a web 13, having opposed planar working surfaces 14 in parallel alignment.

A pitch vial body, generally designated 15, is removably secured to precision formed notches 16 in the web 13 without subsequent adjustment or calibration in the manner taught by U.S. Pat. No. 3,311,990. Once installed, the vial 15 is protected by a pair of cover plates 17 (only one is shown) which overlie the vial on opposite sides of the web 13. The cover plates are secured to the web 13 by screws 18 threaded into openings 19. While the vial 15 is shown in FIG. 1 to be in horizontal alignment with the working surfaces 1, 4, it can be positioned in normal relationship thereto as well.

FIG. 1 also illustrates a conventional level vial 20 and plumb vial 25 installation on the level 10 utilizing the vial securement and protection techniques described with respect to vial 15. The resulting level instrument provides the versatility of pitch, level and plumb measure in a single unit.

FIG. 2 best illustrates the structural details of vial body 15. It is shown to include a shell 30 having a generally cylindrical outer surface 32 which is aligned in co-axial relationship with the central or longitudinal axis 34 of the vial body. The shell 30 further defines a cylindrical closure bore 36 at one end of the vial body and an axially elongated spirit fluid cavity 40 extending therefrom.

The fluid cavity 40 is partially filled with a conventional spirit vial liquid and provides a void or bubble 42 of predetermined size after the vial has been sealed by closure member 44, a generally circular disc telescoped into the bore 36 and secured therein by cementing with a plastic to plastic adhesive or by ultrasonic welding to provide the hermetic sealing of the liquid in the cavity.

As is shown in FIG. 2, the fluid cavity 40 is defined by the inner surface 50 of the vial shell 30. As is shown in FIG. 3, a plane normal to the axis 34 and passing through the cavity 40 defined by the inner surface 50 will define a circular cross-section at any point on the axis 34 of the vial within cavity 40. The radius of the cavity 40 measured from the axis 34 is greatest at the end of the vial body 15 adjacent bore 36. As is shown in FIG. 2, the radius progressively decreases in the axial direction opposite bore 36 to define a symmetrically tapered inner surface 50 which decreases radially and in cross-section along the vial axis 34 and defines the generally truncated ellipsoid configuration illustrated in FIG. 2 and which is oriented co-axially with the vial axis 34.

The vial end opposite bore 36 is provided with a bore 60 having a generally convex projection 62 extending into it. This convex projection 62 conforms generally in configuration to the adjacent end of cavity 40 and is provided therein during the molding process to stress relieve the end and to obviate inaccuracies in the pitch vial produced by uncontrolled shrinkage of any of the critical measuring elements of the vial body 15.

When the vial 15 is installed in a level frame 10 as illustrated in FIG. 1, the pitch or angle "R" defined by the inner section of member 11 with reference line 12 will produce axial movement of the bubble 42 in proportion to the magnitude of the angle "R", i.e., when the angle "R" is zero the bubble position will be that shown in FIG. 2 and as the angle "R" increases, the bubble will move in the opposite axial direction.

To provide an instant visually observable read-out of pitch conditions being measured, a series of spaced indicia 52 are applied to the outer surface 32 of the vial body as illustrated in FIG. 2. The indicia are applied in a pre-calibrated manner to provide pitch information determined by the orientation of the leading edge 54 of the bubble 42. In the vial illustrated, the indicia are applied in 1/16 increments.

In operation, when the leading edge 54 of the bubble 42 is aligned with the indicia 1/16, an immediate visual indication is provided that the surface of member 11 being measured is rising 1/16 of an inch per lineal foot. Therefore, if the distance "L1" illustrated in FIG. 1 is 16 feet, the total rise of member 11 can be quickly obtained by multiplying the 1/16 indicia by 16 with a result of 1 inch. Like calculations can be made with respect to any of the indicia 52 and lengths "L1" of the member 11.

The embodiment of the invention illustrated in FIG. 4 differs from that in FIG. 3 only in the formation of a symmetrically crowned or arcuate vial cavity portion 70 adjacent cap 44 and defined by the inner vial surface 50 of the vial body 15. The radial reduction or inner taper of surface 50 commences at line 72 which defines the end of the crowned cavity 70 opposite cap 44. The taper from line 72 axially toward the smaller vial cavity end is essentially the same as that shown in FIG. 3. The construction of the unit illustrated in FIG. 4 provides an integrated level or plumb measuring capability in addition to the provision for pitch measurement.

I claim:

1. An apparatus for measuring the pitch relationship of first and second lines, comprising a body having an axis defining the first line, the body having an outer surface portion oriented in precise pre-selected alignment with the axis, the body having a cavity provided with an opening, the cavity being oriented in precise pre-selected alignment with the axis and outer surface portion and having a larger cross-section adjacent a first end of the body than at the other, wherein the cross-section of the cavity adjacent the first end of the body decreases progressively and incrementally in the direction of the other end of the body to generally define a truncated ellipsoid, a predetermined quantity of liquid disposed in the cavity insufficient to completely fill the cavity, closure means for hermetically sealing the opening to prevent escape of liquid from the cavity and providing a bubble of predetermined magnitude in the cavity, and indicator means on the body oriented to the axis, the outer surface portion, the bubble and the cavity to provide visually observable pitch information when the body is placed adjacent an element providing a second line oriented to the first line provided by the axis.

2. The apparatus of claim 1 wherein the cross-section of the cavity decreases along the axis of the body and generally defines a truncated ellipsoid having a common axis with the body.

3. The apparatus of claim 2 wherein any plane normal to the axis and passing through the cavity will define a circle co-axially disposed with the common axis.

4. The apparatus of claim 2 wherein the indicator means comprise plural marks on the body arranged in spaced relationship and oriented with the axis to provide a visible measure of the amount of pitch per linear unit of length of a second line.

5. The apparatus of claim 1 wherein the body is secured to a level instrument having a web and a working surface, the body being oriented on the web with the axis of the body in pre-selected alignment with the plane of the working surface and providing a visible measure of the amount of pitch per linear unit of length of a second line when disposed parallel to the plane of the working surface.

6. The apparatus of claim 1 wherein the cross-section of the cavity adjacent the first and larger end of the body includes a symmetrical crown portion for measuring plumb or level conditions and the cavity decreases from the crown portion progressively toward the other end of the body to generally define said truncated ellipsoid from the crown position axially outwardly therefrom.

* * * * *